May 24, 1938.　　　W. M. SHEEHAN　　　2,118,364
RAILROAD-HIGHWAY VEHICLE STRUCTURE
Filed June 20, 1936　　　3 Sheets-Sheet 1
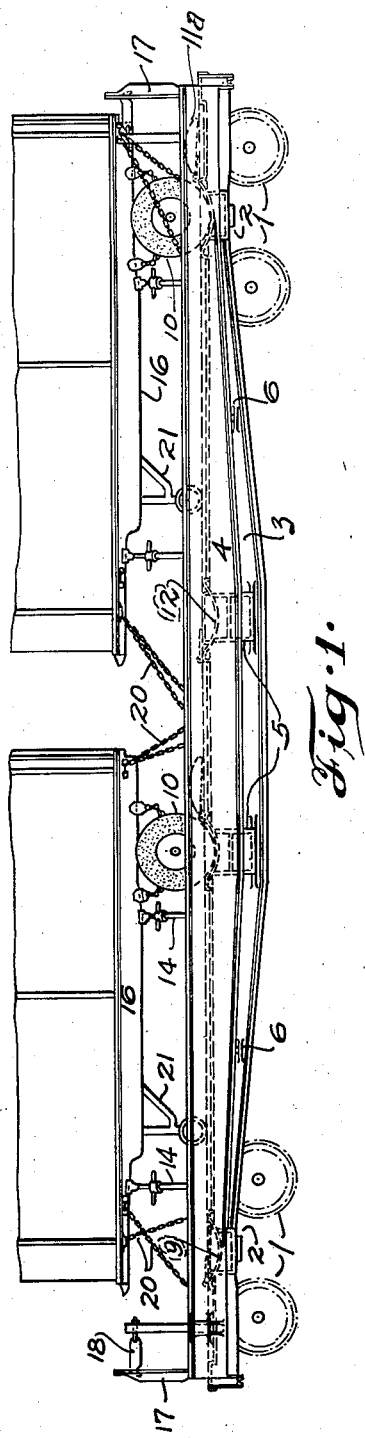
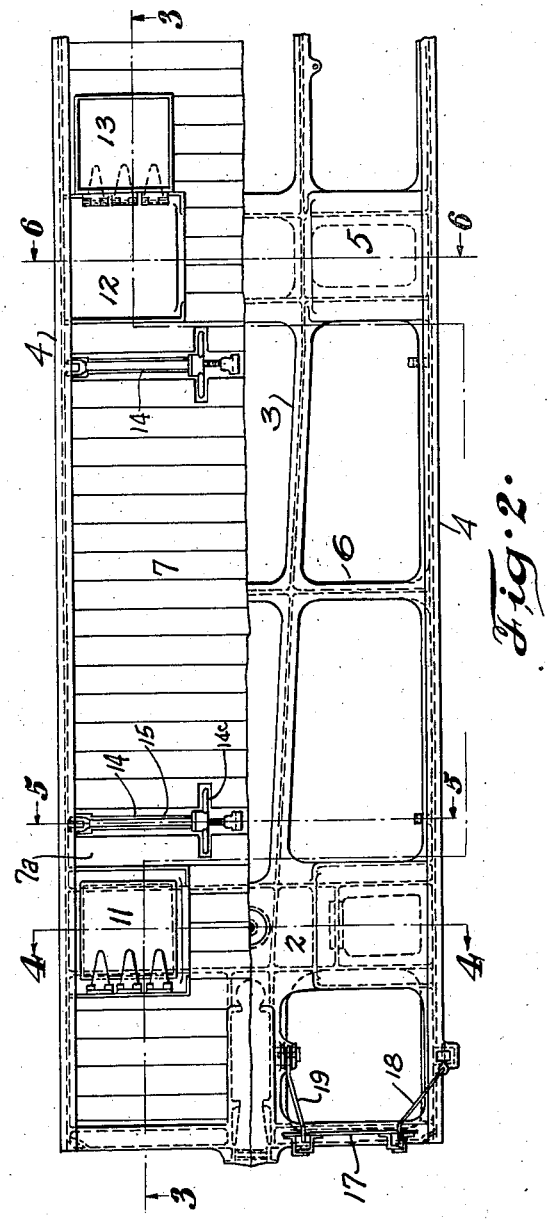
Inventor
William M. Sheehan
By Rodney Bedell
Attorney May 24, 1938. W. M. SHEEHAN 2,118,364
RAILROAD-HIGHWAY VEHICLE STRUCTURE
Filed June 20, 1936 3 Sheets-Sheet 2
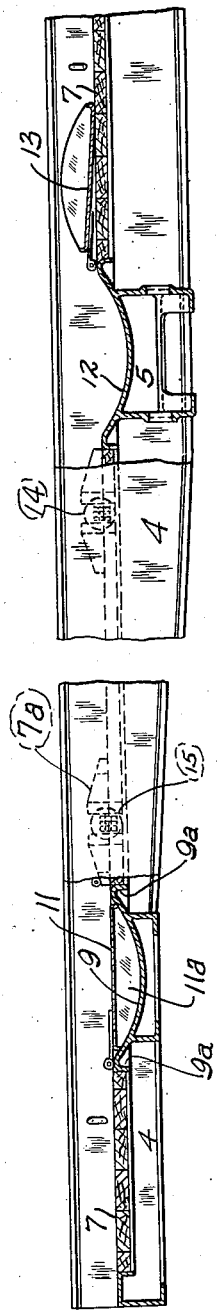
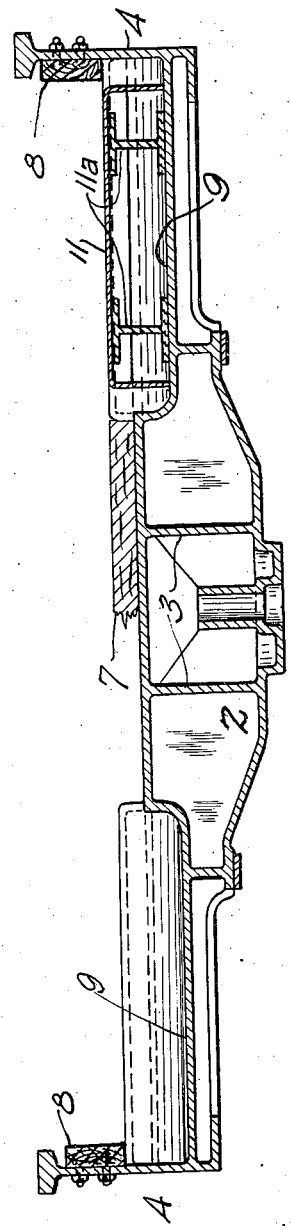
Inventor
William M. Sheehan
By Rodney Bedell
Attorney

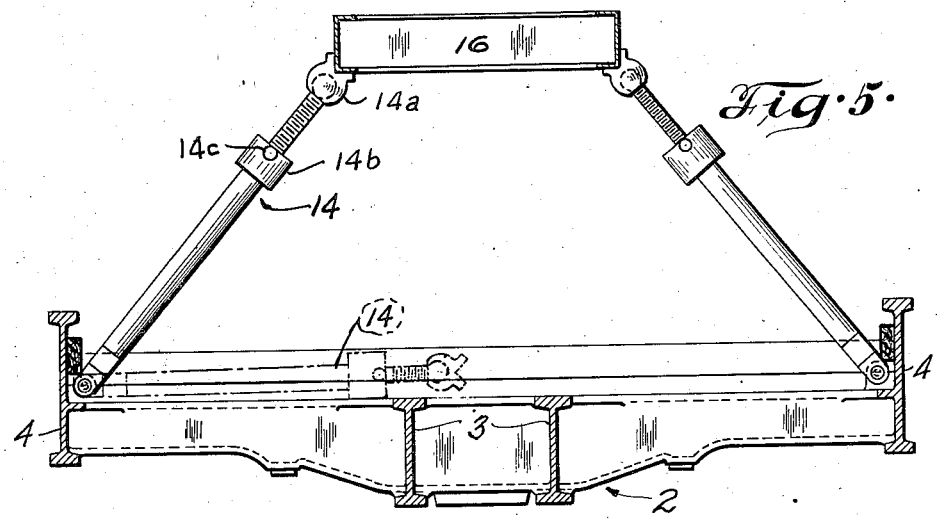
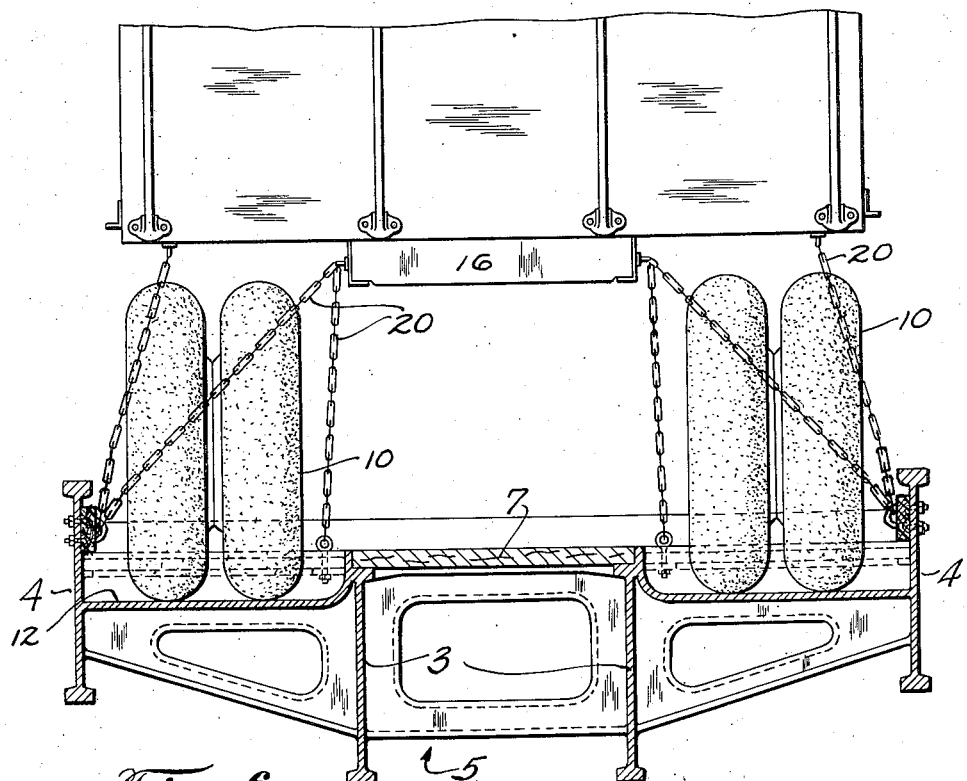

Patented May 24, 1938

2,118,364

UNITED STATES PATENT OFFICE 2,118,364

RAILROAD-HIGHWAY VEHICLE STRUCTURE

William M. Sheehan, Merion, Pa., assignor to General Steel Castings Corporation, Granite City, Ill., a corporation of Delaware Application June 20, 1936, Serial No. 86,282

16 Claims. (Cl. 105—368)

The invention relates to railway rolling stock and to the combination therewith of highway freight-carrying units, and the invention consists in a railway carrier especially adapted for highway trucking units and the securing of the latter in position on the carrier.

One object of the invention is to utilize a railway vehicle adapted for flat car or low side gondola car service and arranged for carrying motor trucks or motor truck trailers so that the trucks or trailers will be securely positioned on the car without requiring chock blocks or other attaching devices and with minimum interference with the normal use of the car when the highway carriers are not mounted thereon.

Another object of the invention is to facilitate the loading and unloading of the highway carriers onto and off of the railway car.

Another object of the invention is to lower the center of gravity of the complete transportation unit below what would result from the ordinary mounting of a highway carrier upon a railway freight car.

These and other detailed objects of the invention which will be apparent from consideration of the drawings and the following description are attained by the structure illustrated in which—

Fig. 1 is a side view of a railway car having two highway trailers mounted thereon.

Figure 2 is a top view of approximately one-half of the railway car shown in Figure 1, a portion of the flooring being removed to illustrate the car framing.

Figure 3 is a longitudinal section and elevation taken approximately on the line 3—3 of Figure 2.

Figures 4, 5 and 6 are transverse vertical sections taken on the corresponding section lines of Figure 2.

The railway car includes the usual trucks, indicated at 1, and carrying the truck frame comprising bolsters 2 mounted upon the trucks and longitudinal center sills 3 and side sills 4 extending between the bolsters and to the ends of the car. Intermediate the bolsters are wide transverse cross bearers 5 and relatively narrow transverse braces 6. Both center sills and side sills are shown as of fish belly contour and the side sills are shown as projecting above the top of the floor 7 and being lined with wooden stringers 8 for protection of the tires of the highway vehicles when moving along the car.

Each bolster 2 is substantially box-shaped in cross section and wider than the usual bolster structure. For a restricted portion of its length and near its outer ends, the top wall of the bolster forms an arcuate depression 9, the radius of which corresponds generally to that of the highway trailer wheels 10. This top wall is extended beyond the side walls of the bolster to a level of the top of the floor 7 and terminates in vertical flanges 9a reinforcing the outer edge of the top wall and forming an abutting surface for the adjacent floor boards. The bottom of the depression 9 is substantially below the level of the floor of the car but at all times, except when the trailer wheels are to be received into the recesses, the floor line may be maintained over the recess by the cover 11 hinged to the bolster at one side of the recess and movable from the position shown in Figure 3 to the position shown at the right hand end of Figure 1. In such position the cover is reinforced throughout its length by elements 11a which rest upon the bolster surface 9 and support the cover throughout the width of the bolster. When the cover is turned back to expose the bolster recess, elements 11a are so spaced that they do not interfere with the trailer wheels 10.

Cross bearers 5 are constructed similarly to bolsters 2, being provided with arcuate recesses 12 and covers 13 therefor.

Support jacks 14 are arranged in pairs at suitable points lengthwise of the car, each jack being pivoted at its outer end near the corner between the side sill and floor and being movable about its pivot from a horizontal position as indicated in broken lines in Figure 5 to a raised position as shown in full lines in Figure 5. In the lowered horizontal position, each jack is received into a recess 15 therefor provided in the floor and if the jack is thicker than the floor, as shown, inclined elements 7a may be placed at the sides of the jack receiving recess to protect the jack and facilitate the passage of trailer wheels thereover.

In its raised position, each jack may extend upwardly and inwardly of the car to engage the frame 16 of the truck trailer. Preferably each jack is extensible, as indicated by the threaded arrangement illustrated, and after the swiveling upper ends 14a of the jacks have been adjusted to the trailer frame 16, the bearing nuts 14b may be rotated by handles 14c to place the desired amount of the load on the jacks.

As best indicated in Figure 5, the transverse elements of the underframe, a pair of the upwardly converging support jacks, and the framework of the truck trailer constitute a truss-like structure for supporting the trailer load independently of the trailer wheels, springs and axle, although ordinarily the same need never be relieved of their entire load.

Diagonally opposite corners of the car are equipped with aprons 17 each hinged to the car floor or end sill and arranged to be projected outwardly therefrom to overlie the opposing portion of an adjacent car or loading platform to provide for the movement of a trailer from one car to another or between car and platform. These aprons may be held in upright position, as shown in Figure 1, by links 18 and 19 pivotally mounted on posts or brackets on the car frame.

In operation, the trailer will be loaded at the consignor's place of business and hauled by truck or tractor to the railroad terminal where it will be moved up a ramp or over a platform onto the railway car and along the same to its approximate position. Then the covers 11 or 13, as the case may be, nearest the main wheels of the trailer will be thrown back and the trailer moved to seat its wheels in the corresponding recesses, the landing gear 21 being lowered and the tractor or truck removed. Jacks 14 will then be brought into position and manipulated by their handles 14c to engage the trailer frame 16 and place the jacks under compression. Chains 20 will secure the trailer to the car framing to hold the trailer down. The chains may be attached before the jacks are adjusted to their final position, thereby placing the chains under tension.

The construction described provides for the convenient transportation by rail of highway trailers of the type mentioned, the carriers being adapted to reduce by ten or twelve inches the height at which such trailers have previously been carried on the usual flat cars and at the same time the car may be used as the ordinary flat car or low side gondola car without any sacrifice of capacity.

As is obvious by reference to Figure 1, the trailer may be moved onto the car from either end and secured in position with its main wheels 18 over the bolster or over the central transverse members. The trailers may be arranged facing the same end of the car as indicated in this figure or they may be arranged with both sets of main wheels over the bolsters 2 or with both sets of main wheels over the intermediate transverse members 5, all depending upon the convenience of the loading platform or ramp, or the adjacent car, and the nature of the truck or tractor by which the trailer is moved.

It is apparent that many of the details of the structure may be varied substantially from that shown without departing from the spirit of the invention and, as illustrative of such changes, reference is made to possible variations in the shape of the bolsters and other transverse members, the hinging of the covers so they pivot transversely of the car instead of longitudinally, or they may be arranged to slide into position instead of swinging into position. Similarly the end aprons may be slidably mounted on the car instead of being pivoted thereto. The details of the strut members may be modified other than as shown, and the exclusive use of such modifications as come within the scope of the claims is contemplated.

I claim:

1. In a railway car of the class described, side sills, underframe transom structure extending between said sills and having a top face with depressions between its ends and sides for receiving the lower portions of the wheels of a highway vehicle mounted on the car.

2. In a railway car of the class described, underframing including main longitudinals and transverse members, said transverse members having relatively deep sections extending from end to end and having top faces between said sections, there being depressions in at least some of said top faces extending below the level of the top of said sections for receiving the lower portions of the wheels of highway vehicles mounted on the car.

3. In a railway car of the class described, an underframe transom of general box-like cross section and having its top depressed between its ends and sides for receiving the lower portion of the wheel of a highway vehicle mounted upon the car.

4. In a railway car of the class described, an underframe transom with a top face having a width exceeding its depth and having a depressed portion of said face for receiving the lower portion of the wheel of a highway vehicle mounted on the car, the top of said transom immediately adjacent to the sides and ends of its wheel-receiving portion being at the level of the top of the end of the transom.

5. In a railway car of the class described, an underframe transom of general box-shaped cross section with a top wall and side walls, said top wall being depressed intermediate said side walls to receive highway vehicle wheels and extending outwardly from said side walls and terminating in downwardly projecting flanges.

6. In a railway car of the class described, an underframe, a floor thereon, said underframe including a transom of general box-shaped cross section with side walls and a top wall depressed intermediate said side walls to receive highway vehicle wheels and extending outwardly and upwardly from said side walls to the level of the top of said floor, said floor being interrupted across the depressed portion of said transom.

7. In a railway car of the class described, an underframe transom having a depression in its upper face for receiving the lower portion of the wheel of a highway vehicle mounted on the car, and a cover for bridging said depression from side to side of the transom to maintain a flat top surface for the transom when the depression is not being utilized as described, there being elements on the underside of said cover for supporting the same from the bottom of said depression.

8. In a railway car underframe, center sill structure, side sill structures, and transom structure including upper elements extending between said structures at the same level as the top of said center sill structure, parts of said transom structure being depressed to a lower level and arranged to substantially fit around the lower portions of the wheels of a highway vehicle mounted upon the underframe, the transom structure adjacent the depression extending upwardly and outwardly therefrom to maintain the cross section strength of the transom structure from end to end.

9. In a railway car underframe, spaced bolsters with top parts forming chord-like elements, depressions in the tops of said bolsters between the ends and sides thereof for receiving the lower portions of the wheels of highway vehicles mounted on the car, cross transoms intermediate said bolsters and provided with similar depressions, and means adjacent each set of depressions for anchoring such vehicles to the car.

10. In a railway car, an underframe having relatively short depressions spaced apart longitudinally of the car and arranged to receive the lower portions of the rear wheels of a highway trailer vehicle irrespective of the end of the car faced by the vehicle, and a plurality of devices spaced longitudinally of the car for engaging and at least partially supporting the body of such a vehicle adjacent its rear wheels irrespective of the direction of its mounting on the car.

11. In a railway car of the class described, an underframe with four transverse members, two being near the ends of the car and two being near the center of the car, each member being of general box-shaped section with a depression in its top wall between the sides and ends thereof for receiving the main rear wheels of a highway trailer mounted on the car, said members being disposed to accommodate the main rear wheels of two such trailers irrespective of the direction from which the trailer is moved onto the car.

12. In a railway car of the class described, a transverse framing member having a portion extending throughout a part of the length of said member, said portion including a top face which is arcuately concave longitudinally of the car to receive the wheel of a vehicle carried thereon.

13. In a railway car of the class described, a transverse framing member having a portion extending throughout a part of the length of said member, said portion including a top face which is arcuately concave longitudinally of the car to receive the wheel of a vehicle carried thereon, there being reinforcing elements depending from said portion and extending along the same transversely of the car.

14. In a railway car of the class described, a transverse framing member having a portion extending throughout a part of the length of said member, said portion including side walls and a top face which is arcuately concave longitudinally of the car to receive the wheel of a vehicle carried thereon, there being reinforcing elements depending from said portion and spaced from said side walls.

15. In a car of the class described, spaced trucks, an underframe including longitudinals exending between said trucks, and bolsters supporting said longitudinals and the car load on said trucks, each of said bolsters having a top wall depressed between its sides throughout a portion extending between said longitudinals to receive the lower parts of the wheels of a highway vehicle mounted on the car.

16. In a car of the class described, spaced trucks, an underframe including longitudinals extending between said trucks, and bolsters supporting said longitudinals and the car load on said trucks, each of said bolsters having a top wall and side walls, said top wall being widened throughout a portion of its length and extending beyond said side walls and provided with a depression in its upper face at said widened portion to receive the lower parts of the wheels of a highway vehicle mounted on the car, said widened portion including vertical reinforcing elements spaced from said side walls.

WILLIAM M. SHEEHAN.